United States Patent Office 3,219,935
Patented Nov. 23, 1965

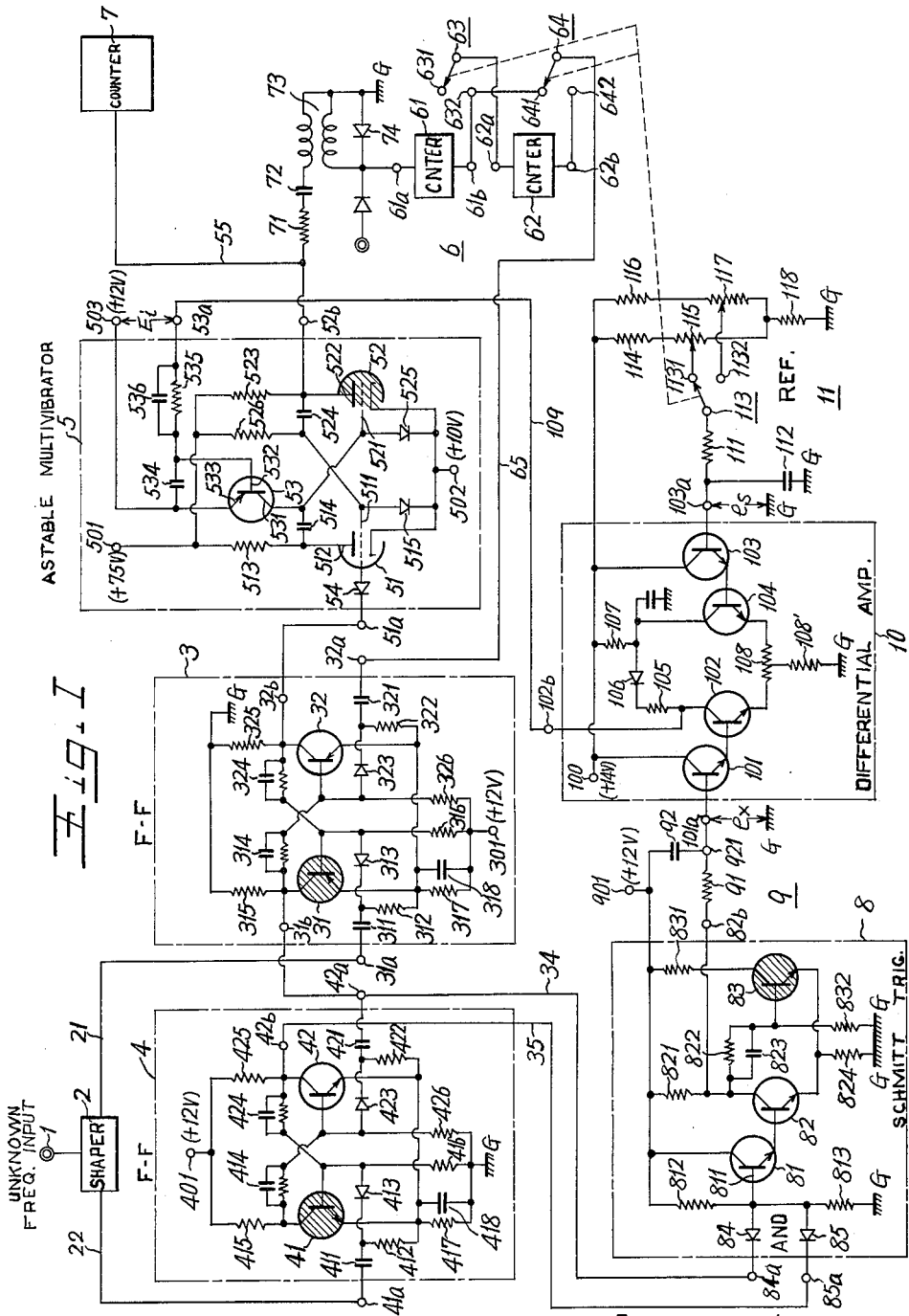

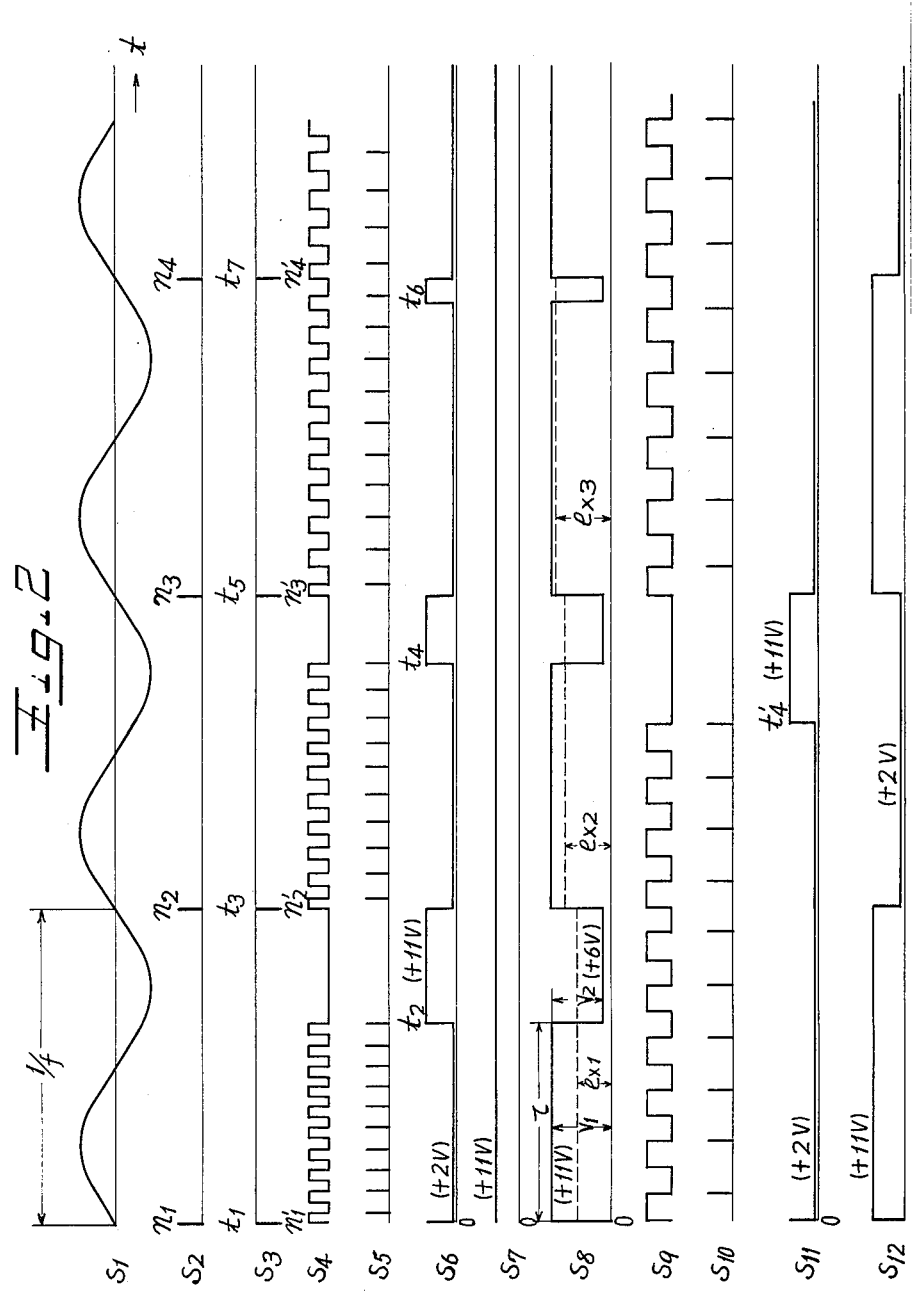

3,219,935
MEASURING-COUNTING SYSTEM FOR DETERMINING AND CONTROL-CIRCUIT FOR CONTINUOUSLY PROVIDING EXACT MULTIPLE OF UNKNOWN FREQUENCY INPUT
Morisaburo Katakami, Tokyo, Japan, assignor to Kabushikikaisha Yokogawa Denki Seisakusho (Yokogawa Electric Works Ltd.), Tokyo, Japan, a corporation of Japan
Filed July 26, 1962, Ser. No. 212,543
Claims priority, application Japan, Aug. 8, 1961, 36/28,650
12 Claims. (Cl. 328—28)

This invention relates to a frequency counting system and more particularly to a frequency counting system which has the ability to account low frequencies with a high degree of speed and reliability.

When it is desired to determine the frequency of low frequency signals the time required to obtain such information is proportional to that frequency to be measured and a given time base, which is generally one second. If the frequency to be measured is varying or otherwise existent only for a short time duration it is very difficult to obtain an accurate indication of the frequency being measured.

It is therefore an object of this invention to provide a frequency measuring system which will indicate the exact value of the frequency under examination in a short period of time, which will be substantially less than one second.

Another object of this invention is to provide a frequency multiplier which is controlled by the frequency under examination, the frequency multiplier output then being measured to give an accurate indication of the test frequency.

Another object of this invention is to provide control means from the frequency under examination which will automatically control the frequency of the frequency multiplier to a predetermined multiple of the lower frequency under test.

Other objects, features and advantages of this invention will become apparent from the following description taken in conjunction with the accompanying drawings in which:

FIGURE 1 is an electrical circuit diagram showing an embodiment of the frequency measuring system of this invention; and FIGURE 2 shows the timing waveforms illustrating the progress in time of the operation of the frequency measuring system shown in FIGURE 1.

When a sine wave $S_1$ of unknown frequency is applied to terminal 1 and is converted to positive and negative trigger signals $S_2$ and $S_3$ respectively. This conversion is accomplished by a wave shaping circuit 2 which can be a Schmitt triggering circuit. The positive trigger pulses $S_2$ are applied to a first flip-flop circuit 3 through a line 21, while the negative trigger signals are applied to a second flip-flop circuit 4 through a line 22.

In the quiescent condition, the first flip-flop circuit 3 has the transistor 31 conductive and the transistor non-conductive. In the quiescent state, the flip-flop circuit 4 has the transistor 41 conductive and the transistor 42 non-conductive. When a positive trigger pulse $S_2$ is applied to the first flip-flop circuit 3 the transistor 31 will be rendered non-conductive while the transistor 32 will be rendered conductive, which in turn will apply a positive signal to output terminal 32b and a negative signal to output terminal 31b. At the same time the positive signal is applied to the flip-flop circuit 3 a negative signal $S_3$ was applied to the input of flip-flop circuit 4 through a line 22.

However, the negative input from line 22 is not as strong a signal as the negative signal from terminal 31b, which is applied to an input terminal 42a, and therefore the flip-flop circuit 4 will remain in the quiescent state.

When the flip-flop circuit 3 has been triggered, the positive signal from terminal 32b is applied to a terminal 51a of a variable frequency oscillator circuit 5. This will render the variable frequency oscillator circuit 5 operative thereby producing a high frequency square wave signal $S_4$ at the output terminal 52b. In the absence of a positive signal at terminal 51a the variable frequency oscillator circuit 5 will be rendered inoperative and the high frequency square wave signals $S_4$ will be removed from the output terminal 52b.

The high frequency square wave signal $S_4$ is applied to an electronic counter 7 through a line 55. The counter 7 will count each pulse of the high frequency signal $S_4$ until the variable frequency oscillator circuit 5 is rendered inoperative. The high frequency signal $S_4$, from terminal 52b, is also applied to a multiplier setting circuit 6 which requires a predetermined number of input pulses to produce a single output pulse. By way of example, ten pulses from the signal $S_4$ will be required at terminal 61a if one pulse is to be obtained in the output line 65.

After the desired predetermined number of pulses from terminal 52b has been applied to the multiplier setting circuit 6 a positive pulse therefrom is applied to input terminal 32a through the line 65. This action will render the transistor 32 non-conductive and the transistor 31 conductive thereby returning the flip-flop circuit 3 to its quiescent state.

The quiescent state of the flip-flop circuit 3 will remove the positive signal from terminals 32b and 51a which in turn will render the variable frequency oscillator circuit 5 inoperative. Also the quiescent state of flip-flop circuit 3 will cause a positive signal to be applied through a line 34 to a terminal 84a of an AND gate circuit 8. The quiescent state of flip-flop circuit 4 will also produce a positive signal at terminal 42b and therefrom through line 35 to the input terminal 35a of the AND gate circuit 8. Simultaneous application of positive signals at terminals 34a and 35a will render the AND gate operative thereby decreasing the D.C. voltage applied to an output terminal 82b. The negative portion of the signal $S_8$, which will be discussed in more detail hereinbelow, is then applied through a filter circuit 9 to an input terminal 101a of a differential amplifier circuit 10. The signal applied to the input terminal 101a is then compared with a reference signal which is obtained from the reference circuit 11 and applied to an input terminal 103a of the differential amplifier 10. A signal corresponding to the difference of the negative signal on terminal 101a and the reference signal on terminal 103a is then applied to a terminal 53a through the line 109. The control signal at the input terminal 53a of the variable frequency oscillator circuit 5 is then applied to the base 532 of the transistor 53 through a parallel network comprising resistor 535 and capacitor 536, thereby changing the conductivity of the transistor 53 which serves as an automatically controllable resistor which will vary the output frequency of the oscillator circuit 5.

Therefore, upon completion of sampling one cycle of an unknown frequency the variable frequency oscillator circuit 5 is then automatically adjusted to approach the desired multiple frequency of the unknown frequency being measured. The sampling of the second cycle of the unknown frequency being measured is treated in a similar manner, however, the negative portion of the signal $S_8$ has a shorter time duration and the average voltage applied to the terminal 101a is consequently higher. After sampling several cycles of the unknown frequency the variable frequency oscillator is adjusted as mentioned hereinabove so that the desired harmonic frequency therein produces a simultaneous input signal at terminal 32a when the positive signal $S_2$ is applied to the input terminal 31a, thereby maintaining the oscillator circuit 5 in continuous operation at a predetermined multiple frequency. This action will also eliminate the application of negative portions of the signal $S_8$ to the differential amplifier circuit 10 thereby effecting no further change in the conductivity of the transistor 53 in the variable frequency oscillator circuit 5.

*Detailed description of waveform shaping circuit 2*

The waveform shaping circuit 2 shown in block is known as a Schmitt circuit and composed mainly of a multivibrator circuit of emitter or cathode coupling. By this waveform shaping circuit 2 the waveform of alternating electric signals to be measured $S_1$ in FIGURE 2 is applied to the input terminal 1 and shaped, and each time one cycle of said signals finishes one positive pulse wave is led out from one lead line 21 of the shaping circuit 2 and one negative pulse wave from the other lead line 22. Then, the positive pulse $S_2$ in FIGURE 2 is led out from the lead line 21 and applied to an input terminal 31a of the first flip-flop circuit 3, while at the same time negative pulse $S_3$ in FIGURE 2 from the lead line 22 is applied to an input terminal 41a of the second flip-flop circuit 4.

*Detailed description of flip-flop circuits 3*

The first flip-flop circuit 3 includes two p-n-p type transistors 31 and 32 respectively provided with three electrodes; a base, emitter and collector. The base of the transistor 31 is connected through a diode 313 and a condenser 311 to the terminal 31a and this base is also connected to the collector of the other transistor 32 through a parallel element 324 of a resistor and a condenser. The base of the transistor 32 is connected through a diode 323 and a condenser 321 to a terminal 32a and this base is also connected to the collector of the transistor 31 through a parallel element 314 of a resistor and a condenser. The bases of the both transistors 31 and 32 are connected respectively through resistors 316 and 326 to a positive electric potential terminal 301 of a power source (not shown in the drawing). The collectors are connected to a ground point respectively through load resistors 315 and 325. A connection point of the condenser 311 and the diode 313 and that of the condenser 321 and the diode 323 are connected respectively through resistors 312 and 322 to a common connection point of the both emitters, the common connection point being further connected to the positive electric potential terminal 301 through a parallel element of a resistor 317 and a condenser 318.

In the above flip-flop circuit, the initial condition of the two transistors 31 and 32 is such that the transistor 31 is "ON" across the emitter and base thereof and the other transistor 32 is "OFF" across the emitter and base thereof. In such a condition, when a positive pulse is applied to the input terminal 31a the transistor 31 is inverted from "ON" to "OFF" and the other 32 from "OFF" to "ON" at the same instant. As a result of this, a negative step signal voltage is produced at the output terminal 31b of the transistor 31 and a positive step signal voltage is also generated at the output terminal 32b of the transistor 32. Now, in the following description the step signal voltage is classified into two kinds, namely positive and negative ones, and the positive step voltage goes up from 2 v. to +11 v. and thereafter maintains the potential of +11 v., while the negative one goes down from +11v. to +2 v. and thereafter holds the potential of +2 v. A positive pulse wave signal being applied to the terminal 32a from a multiple setting circuit 6 hereinafter described when the transistor 32 is "ON" and the other one 31 "OFF" as described above, the former becomes "OFF" and the latter "ON" in a moment to return to their initial conditions. Consequently positive and negative step signal voltages are sent out respectively from the output terminal 31b of the transistor 31 and from the output terminal 32 of the transistor 32.

*Detailed description of flip-flop circuit 4*

The connection of the second flip-flop circuit 4 is substantially the same as the aforementioned first flip-flop circuit 3, in which transistors 41 and 42 are of n-p-n type and initially the transistor 41 is "ON" and the other one 42 "OFF." When a negative pulse signal is applied to the input terminal 41a of the transistor 41 the transistors respectively invert their conditions, namely the transistor 41 becomes "OFF" from "ON," whereas the transistor 42 "ON" from "OFF." Then, a negative step signal voltage is produced at an output terminal 42b of the transistor 42. When the two transistors are in this condition and a negative pulse signal is applied from the output terminal 31b of the first flip-flop circuit through a lead line 34 to an input terminal 42a of the transistor 42, the transistor 42 becomes "OFF" from "ON" and the other one 41 "ON" from "OFF" to return to their initial state. At this time a positive step signal voltage is sent out from the output terminal 42b of the transistor 42.

In this second flip-flop circuit 4, when the transistor 41 is "ON" and the other one 42 is "OFF" and negative pulse signals are applied simultaneously to the input terminals 41a and 42a of the transistors 41 and 42, the pulse signal applied to the input terminal 42a operates superiorly to that to the other input terminal 41a. This is accomplished by selecting the time constant of a coupling circuit of one input terminal 42a (the product of the capacitance value of a capacitor 421 and the resistance value of a resistor 422) larger than that of a coupling circuit of the other input terminal 41a (the product of the capacitance value of a capacitor 411 and the resistance value of the resistor 412). In the illustrated embodiment the desired operation was carried out by selecting the resistance values of the resistors 412 and 422 respectively 43 KΩ, the capacitance value of the capacitor 411 150 pf., and that of the capacitor 421 470 pf. Accordingly, when negative pulse signals are applied to the terminals 41a and 42a at the same time the transistor 42 is held "OFF" and the other one 41 "ON," and hence an electric potential (+11 v.) which is substantially the same as a positive potential (+12 v.) to be applied to a power source terminal 401 is continuously impressed through a lead line 35 to one input terminal 85a of a gate circuit 8.

*Detailed description of variable oscillator circuit 5*

The variable frequency oscillation circuit 5 includes electron tubes 51 and 52 and a p-n-p type transistor 53. The electron tubes 51 and 52 form an astable multivibrator circuit of plate coupling, and a grid 511 of the electron tube 51 is connected through a diode 54 to a first input terminal 51a. The above grid 511 is also connected through a capacitor 524 to a plate 522 of the electron tube 52 and further through a resistor 526 to a positive electric potential terminal 501. A grid 521 of the other electron tube 52 is connected to the collector 531 of the transistor 53 and further to the plate 512 of the electron tube 51 through a capacitor 514. The plates 512 and 522 of the two electron tubes 51 and 52 are connected respectively through load resistors 513 and 523 to the aforementioned positive electric potential terminal 501. The emitter 533 of the transistor 53 is connected to a positive electric potential terminal 503 and its base 532 is connected through a resistor 535 to a second input terminal 53a.

In the variable oscillation circuit 5 described above, when the electric potential of the first input terminal 51a is lower than the potential (+10 v.) applied to the cathode of the electron tube 51 a forward direction voltage is impressed across the electrodes of the diode 54, turning the diode 54 conductive. Consequently the grid potential of the electron tube 51 is clamped at the potential of the terminal 51a, so that the aforementioned electron tube 51 is held "OFF," thus stopping the oscillation. Then, when a positive step signal voltage is applied to the first input terminal 51a from the aforesaid first flip-flop circuit 3 and the potential of the said terminal 51a goes up to a high potential (+11 v.), the diode 54 becomes "OFF" and hence the grid potential of the electron tube 51 is released from its clamped condition mentioned above. As a result of this, the electron tubes 51 and 52 repeat to turn "ON" and "OFF" respectively alternately, performing self-oscillation whereby rectangular wave signals of some frequency ($S_4$ in FIGURE 2) are sent out to a lead line 55 from an output terminal 52b of the electron tube 52. The frequency (repeating frequency) of the aforementioned output rectangular wave signal is determined mainly by the sum of the time constants which are determined respectively by the product of the capacitance value of the capacitor 524 and the resistance value of the resistor 526 and by that of the capacitance value of the capacitor 514 and the internal operating resistance across the collector and emitter of the transistor 53.

The internal operating resistance of the transistor 53 varies sharply in response to the potential difference between the second input terminal 53a and the positive potential terminal 503 to which the emitter is connected. With the change of this operating resistance the frequency of the output rectangular wave signal varies over a wide range. For example, when double triodes 6RHH2 are used as the electron tubes 51 and 52, a p-n-p type alloy junction type germanium transistor 2SA125 as the transistor 53, the resistance value of the resistors 513 and 523 is respectively 2 K$\Omega$, the resistance value of the resistor 526 is 200 K$\Omega$, the capacitance value of the capacitor 514 is 150 pf., the capacitance value of the capacitor 524 is 50 pf., the resistance value of the resistor 535 is 10 K$\Omega$ and D.C. voltages of +75 v., +10 v., +12 v. are applied respectively to the positive potential terminals 501, 502 and 503, if a variable voltage such that the change of the potential of the terminal 53a to the positive potential terminal 503 becomes −600 mv. to −150 mv. is applied, the frequency of the output rectangular signal varies within a range from 250 kc. to 1 kc. Diodes 515 and 525 respectively inserted between the grids 511 and 521 of the electron tubes 51 and 52 and a positive potential terminal 502 serve to clamp at a certain value the voltage across the grid and cathode of the electron tube 51 or 52 which is conductive. In view of the characteristics of the diodes, it is desired that in case of an inverse voltage being impressed across the electrodes, the inverse current flowing across the electrodes is very small. For example, a silicon diode now on the market under the name of SD102 is favorable. A capacitor 534 is inserted between the base 532 and the emitter 533 of the transistor 53 for the purpose of weakening the influence of impulse waves from the collector 531 to the input circuit of the base 532 and also for eliminating the pulsation of D.C. signals impressed to the input circuit of the transistor 53. The capacitance of the capacitor 534 is 400 µf. A capacitor 536 connected in parallel to the base input resistor 535 of the transistor 53 serves to speed up the transient response time and its capacitance value is 10 µf.

*Detailed description of multiple setting circuit 6*

The multiple setting circuit 6 is composed of a cascade circuit of two decade counter units 61 and 62. The counters 61 and 62 are counter circuits of such a system in which a flip-flop circuit of four stages, for example, is connected in cascade and some of its output is fed back to the preceding stage. When the two counters 61 and 62 are connected in cascade to each other respectively through interlocking switches 63 and 64, the counter 61 counts the pulses applied to the input terminal from 0 to 9 of one figure and the counter 62 counts from 0 to 9 of the highest order of two figures, the pulses being supplied to the input terminal 61a.

If now movable contacts of the switches 63 and 64 are pressed to contact with contact points 631 and 641 as illustrated in FIGURE 1, an output end 61b of the counter 61 is connected to a lead line 65 through the switches 63 and 64. Consequently first to ninth pulse signals among positive ones applied to the input terminal 61a are counted by the counter 61 and when a tenth positive pulse is added to the input terminal the counting of the said counter 61 is returned to zero and one pulse is sent out to the lead line 65 simultaneously. When the aforesaid switches 63 and 64 are turned down respectively to contact points 632 and 642 the output end 61b of the counter 61 is connected through the switch 63 to the input end 62a of the counter 62 and the output end 62b if the counter 62 is to the lead line 65 through the switch 64. Thus, first to ninety-ninth pulse signals out of those applied to the input end 61a are counted respectively by the counters 61 and 62, and when one hundredth pulse signal is added the counting of the counters 61 and 62 is returned to zero and one pulse is sent out to the lead line 65 simultaneously.

*Detailed description of counter 7*

A counter 7 is an electronic counter now widely used and counts successively the number of waves of signals ($S_4$ in FIGURE 2) applied through the conductor 55 to its input end, indicating it in numeral references of the binary or decimal notation. Some of the aforementioned signal waves transmitted through the conductor 55 are applied to the primary side of a transformer 73 through a resistor 71 and a capacitor 72. As a diode 74 is connected in parallel to the secondary side of the transformer 73, there is produced one positive pulse ($S_5$ in FIGURE 2) for one cycle of the signal waves at the aforesaid secondary side, which pulse signal is added to an input terminal 61a of the circuit 6.

*Detailed description of gate circuit 8*

The gate circuit 8 consists of an AND-gate circuit including two diodes 84 and 85 and a Schmitt circuit for waveform shaping including n-p-n type transistors 81, 82 and 83. The negative electrode, the diode 84 and that of the diode 85 are connected respectively to terminals 84a and 85a and their positive electrodes are both connected to the base 811 of the transistor 81. To the base 811 is supplied a voltage (about 7 v.) caused by that D.C. voltage (+12 v.) across a positive electric potential terminal 901 and a ground G divided by resistors 812 and 813. Therefore, if the electrical potential of either one or both of the input terminals 84a and 85a of the diodes 84 and 85 goes down to a value near zero potential (for example, +2 v.) when the aforementioned transistor 31 is "OFF" and or the transistor 42 is "ON," the diode becomes conductive and hence the base 811 of the transistor 81 is forced to be clamped at a potential (+2 v.) nearly equal to the zero potential, thus holding the transistor 81 "OFF." On the contrary, if the transistor 31 becomes conductive and the other one 42 non-conductive and the collector potential goes up to +11 v. which is applied to the input terminal 84a and 85a at the same time and when the potential of the said terminal 84a and 85a rises higher than the potential (+7 v.) of the base 811, both the diodes 84 and 85 become inversely biased and the potential of the base 811 is released from the clamped state. Accordingly a potential of +7 v. is impressed on the base 811 of the transistor 81 and the transistor 81 becomes conductive. The emitter of the transistor 81 is connected directly to the base of the transistor 82 and the collector of the transistor 82 is connected through a parallel circuit of a resistor 822 and a capacitor 823 to the base of the transistor 83, and both the emitters of the transistors 82 and 83 are grounded through a common resistor 824. Further, both the collectors of the transistors 82 and 83 are connected respectively through load resistors 821 and 831 to the aforementioned positive potential terminal 901.

When the transistor 81 is at cut-off condition the transistor 82 is held "OFF" and the other one 83 "ON." Therefore the potential of a collector output terminal 82b of the transistor 82 is as high as substantially +11 v. When the transistor 81 becomes "ON," the transistor 82 turns "ON" and transistor 83 turns "OFF" in response thereto. Accordingly a large collector current flows to a load resistor 821 of the transistor 82 and the potential of the output terminal 82b lowers to a voltage (+6 v.) determined by the resistors 821 and 824. Consequently, in the case where potentials applied to the input terminals 84a and 85a of the AND gate circuit 8 are equal to +11 v., a potential signal of +6 v. is applied to the output terminal 82b, and in the case of being not equal, a signal of +11 v. is sent out from the output terminal 82b. The duration of time of these two potential signals S8 is controlled by output signals from the aforesaid first and second flip-flop circuits 3 and 4. The waveform of the above mentioned output signal from the output terminal 82b is rectangular as shown by $S_8$ in FIGURE 2.

Detailed description of filter circuit 9

The filter circuit 9 comprises resistor 91 and a capacitor 92 and has input terminal 82b and output terminal 101a connected respectively thereto.

Detailed description of differential amplifier circuit 10

The differential amplification circuit 10 is formed by a combination of two emitter-follower circuits of a circuit including transistors 101 and 102 and another circuit having transistors 103 and 104. The base of the transistor 101 is connected to a terminal 101a, to which an output direct current voltage of the aforesaid filtering circuit 9 is applied through the terminal 101a. The base of the transistor 103 is connected to a terminal 103a to which a reference or standard direct current voltage is added. The emitters of the transistors 102 and 104 are connected to each other by a resistor 108. This resistor 108 is provided with a movable contact, which is grounded through a resistor 108'. The collector of the transistor 102 is connected to the collector of the transistor 104 though a series circuit of a resistor 105 and a diode 106. The collector of the transistor 104 is connected through a resistor 107 to a positive potential terminal 100 and the collectors of the transistors 101 and 103 are connected directly to the aforementioned terminal 100.

In this amplification circuit, assuming that a direct current voltage applied to one input terminal 101a is $e_x$ and a reference direct current voltage to the other input terminal 103a $e_s$, there is produced a variable potential in response to a differential voltage between $e_x$ and $e_s$ at a collector output terminal 102b of the transistor 102. The variable potential of the output terminal 102b is applied through a lead line 109 to the input terminal 53a of the aforesaid variable frequency oscillation circuit 5, thereby controlling the output frequency of the circuit 5.

Detailed description of reference voltage setting circuit 11

The reference voltage setting circuit 11 is formed in such a manner as to set two respectively different reference voltages. To accomplish this, there are provided two series circuits; one comprising a resistor 114, a variable resistor 115 and a commonly inserted resistor 118 and the other a resistor 116, a variable resistor 117 and the said resistor 118. One end of each series circuit is connected to the aforesaid positive potential terminal 100 and the other end is to the ground. Either one of the voltages divided by the variable resistors 115 and 117 is applied by a changeover switch 113 through a resistor 111 to the input terminal 103a of the amplification circuit 10. It is determined by a method hereinbelow described concerning the multiplying factor of the aforementioned multiple setting circuit 6 in which reference voltage of the two is utilized. The switches 63, 64 and 113 are so mechanically connected to one another as to perform changing-over operation simultaneously.

Detailed description of operation

The operations of the entire device of this invention illustrated in FIGURE 1 will hereinafter be explained with reference to the timing waveforms shown in FIGURE 2. In order to simplify the explanation the frequency of the alternating signal $S_1$ to be measured which is applied to the terminal 1 is made $f$ cycle per second. Further the multiplication M is selected 10 and the switches 63, 64 and 113 of the setting circuit 6 are therefore turned onto the upper contact points.

At first I will explain normal operations in case where the initial value of the output frequency of the variable frequency oscillation circuit 5 is higher than $10f$ cycles per second and approaches to $10f$ cycles per second in response to a signal voltage applied to the terminal 53a.

If now a first one of the positive pulses $S_2$ produced at the output end of the waveform shaping circuit 2 by an alternating signal to be measured which is impressed to the input terminal 1 is applied through a conductor 21 to the terminal 31a of the first flip-flop circuit 3 at the time $t_1$, the transistor 31 becomes "OFF" and 32 "ON" and hence a postive step voltage is sent out from one output terminal 32b, by which the oscillation circuit 5 starts to oscillate, and further from the other output terminal 31b is sent out a negative step voltage and this signal voltage $S_6$ is added through a lead line 34 to the input terminal 42a of the second flip-flop circuit 4 and the input terminal 84a of the gate circuit 8. At the aforementioned time $t_1$, a first one of the negative pulses $S_3$ is applied through a lead line 22 to the input end 41a of the second flip-flop circuit 4.

The negative pulses are added to the both input terminals 41a and 42a substantially at the same time, in this case, however, the pulse applied to the terminal 42a operates superiorly in the circuit 4 as described previously and hence the transistor 41 is held "ON" and the other one 42 "OFF." Accordingly the potential of the output end 42b is kept at a positive high potential (+11 v.) and that of the input end 85a of the gate circuit 8 is also held at the aforesaid high potential (+11 v.) $S_7$. When the oscillation circuit 5 starts and oscillating wave voltage signals $S_4$ are sent out from its output terminal 52b to the lead line 55, the number of the oscillating waves of the said signal are counted by the counter 7 and positive pulses $S_5$ are applied to the input terminal 61a of the setting circuit 6 in response to the number of the oscillating waves. As soon as a tenth pulse is added to the input terminal of the said setting circuit 6, a pulse is applied from the output end of the circuit 6 through the lead line 65 to the input terminal 32a of the aforementioned first flip-flop circuit 3 at time $t_2$. Consequently the transistor 31 in the circuit 3 becomes "ON" and the other one 32 "OFF," and a negative step signal voltage from the output terminal 32b is added to the input terminal 51a of the oscillation circuit 5, thereby causing to stop the operation of the oscillation circuit 5.

At the same time a positive step signal voltage produced at the output terminal 31b is applied through the lead line 34 to the input terminal 42a of the second flip-flop circuit 4 and the input terminal 84a of the gate circuit 8. In this case the aforesaid positive step signal voltage applied from the terminal 31b to the input terminal 42a of the second flip-flop circuit 4 is cut off by the diode 423 and hence the circuit 4 is not effected by the inversion of the state of the transistors 31 and 32. Therefore the potential applied from the output terminal 42b of the circuit 4 to the input terminal 85a of the circuit 8 at the aforementioned time $t_2$ is held at the positive high potential (+11 v.), so that the potentials of both the input terminals 84a and 85a become positive high potentials (+11 v.) and the transistors 81 and 82 become "ON" and the other one 83 "OFF" in the respective reverse states. As a result of this, a step signal voltage $S_8$ going down in the negative direction (from +11 v. to +6 v.) is sent out from the output terminal 82b to the smoothing circuit 9.

The positive pulse of a second pulse to be sent out from the waveform shaping circuit 2 at time $t_3$ is applied through the lead line 21 to the terminal 31a and the negative pulse thereof is to the terminal 41a through the lead line 22. Then, a positive step signal voltage is produced from the output terminal 32b of the first flip-flop circuit 3, starting the oscillation circuit 5, and from the output terminal 31b is applied a negative step voltage to the terminals 42a and 84a, thus the transistors 81 and 82 of the gate circuit 8 becoming "OFF." In the duration of the first cycle of the signal to be measured, namely from time $t_1$ to $t_3$ the signal $S_8$ sent out of the output terminal 82b of the gate circuit 8 is held at a high potential $V_1$(+11 v.) from $t_1$ to $t_2$, but from $t_2$ to $t_3$ it is at a potential (+6 v.) lower by $V_2$(+5 v.) than $V_1$. Such change of potential of the output signal $S_8$ repeating at every one cycle of the alternating signal to be measured is smoothed by the smoothing circuit 9, so that an average direct current voltage $e_x$ of each cycle is obtained across an output terminal 921 of the smoothing circuit 9 and the ground.

Assuming that the voltage of the output terminal 82b of the circuit 8 is reduced by the high potential (+11 v.) from $t_1$ to $t_2$ and by the potential $V_2$(+5 v.) from $t_2$ to $t_3$ in each cycle, that the period of the signal to be measured is $T(=1/f)$ and that the time $\tau$ from $t_1$ to $t_2$ is constant in each cycle, an average voltage $e_x$ produced across the terminal 921 and the ground is expressed by the following formula.

$$e_x = V_2 \times \frac{\tau}{T} + (V_1 - V_2) \quad (1)$$

On the other hand, the reference voltage $e_s$ to be compared with the voltage $e_x$ is presented by the following formula with reference to the multiplication M.

$$e_s = V_1 - \frac{V_2}{M} = V_1 - \frac{V_2}{10} \quad (2)$$

That is, $e_s$ is determined principally according to the value of the potential change of the output signal $S_8$ in the gate circuit 8 and the multiplication M and is independent of the frequency of the signal to be measured. Thus, an output voltage is sent out from the output terminal 102b of the amplification circuit 10 to the lead line 109 in response to the differential voltage of the said voltages $e_x$ and $e_s$. Consequently the output frequency of the oscillation circuit 5 is controlled to be reduced from its initial value. Each time the pulse of the signal to be measured is applied to the circuits 3 and 4 the average direct current voltage $e_x$ approaches to the reference voltage $e_s$ until $e_x$ and $e_s$ become substantially equal to each other, when the output frequency of the oscillation circuit 5 becomes nearly equal to a multiplication M, by way of example times the signal to be measured.

In case where the initial oscillating frequency of the variable oscillation circuit 5 is over M times the frequency $f$ to be measured as above described, the output frequency of the circuit 5 gradually approaches to $Mf$ from the frequency higher than $Mf$ becomes balanced at a frequency equal to $Mf$. If, however, the initial frequency is lower than $Mf$, the output frequency of the said oscillation circuit 5 gets balanced at the frequency of $Mf/2$ or $Mf/3$ and in this case the result is completely erroneous.

According to this invention, the above erroneous result can be effectively prevented. That is, in case of such error tending to occur the oscillation circuit 5 is once automatically controlled to oscillate at its highest frequency and performs again its normal operation. This operation will hereinbelow be explained.

At first the initial frequency of the oscillation circuit 5 is assumed to be between $10f \times \frac{1}{2}$ and $10f$ is shown as signal 59 in FIGURE 2. When the tenth pulse in FIGURE 2 of a second cycle of the signal $S_1$ to be measured, is applied to the input terminal 61a of te setting circuit 6 at time $t_4$, the first input pulses ($S_2$ and $S_3$ are respectively added to first and second flip-flop circuits 3 and 4, the first flip-flop circuit 3 is inverted to start the oscillation circuit 5 and the second flip-flop circuit 4 remains unchanged as previously described. Then, when the second input pulses are applied to the terminals 31a and 41a at time $t_3$, the first flip-flop circuit 3 does not return to the former condition but the second flip-flop circuit 4 is inverted, the transistor 41 becomes "OFF" and the other one 42 "ON," and a step voltage $S_{12}$ varying in the negative direction is applied from the output terminal 42b through the lead line 35 to the input terminal 85a of the gate circuit 8. At time $t_4$, one signal pulse is sent out of the output terminal 61b of the counter 61 and applied to the input terminal 32a of the first flip-flop circuit 3 through the lead line 65, then the said circuit 3 is inverted to return to the initial state, by which the operation of the oscillation circuit 5 is caused to cease and a positive step voltage $S_{11}$ is applied from the output terminal 31b through the lead line 34 to the input terminal 84a of the gate circuit 8.

Next, the third signal pulses are added to the terminals 31a and 41a at time $t_5$ and the first and second flip-flop circuits 3 and 4 are respectively inverted. As a result of this, a negative step voltage from the output terminal 31b and a positive step voltage from the output terminal 42b are applied respectively to the input terminals 84a and 85a of the gate circuit 8. Accordingly, as apparent from the potential relationship between the positive step voltage $S_{11}$ and the negative step one $S_{12}$, there is no period when both the potentials at the input terminals 84a and 85a of the gate circuit 8 become +11 v. at the same time. Therefore, since the transistors 81 and 82 of the gate circuit 8 is always held "OFF" and the other one 83 "ON," the direct current voltage $e_x$ applied to the input terminal 101a of the aforesaid amplification circuit 10 goes up to the maximum value (+11 v.). Consequently the potential of the output terminal 102b goes down to the minimum value and is applied through the lead line 109 to the input terminal 53a of the oscillation circuit 5, by which the output frequency of the said circuit 5 is controlled to be at its highest frequency.

After the output frequency of the oscillation circuit 5 is controlled to be at its highest frequency, namely higher than $10f$ as described above, the normal operations are carried out in such order as explained referring to the timing of $S_1$ to $S_8$ in FIGURE 2 and the output frequency of the oscillation circuit 5 is finally adjusted to be $M=10$ times the frequency to be measured.

The above descriptions have been made in connection with the case where the multiplication M is 10. In case of M being 100 in the device of FIGURE 1 the changeover switches 63, 64 and 113 are changed over to the lower contact points. Furthermore, by designing the counters 61 and 62 properly the multiplication M may easily be set to any desired integer value.

Although the foregoing explanations have been made in connection with an embodiment of the circuit in which specific type electron tubes and transistors are used, the circuit may be substituted for another circuit using another type electron tubes and transistors.

An electronic counter of such a type as counts wave number of the signals to be measured at known time intervals can operate with a measuring error of ±1 percent at best. For example, the percentage of the error when measuring signals of 100 cycles per second with a counter counting in the time interval of a second is ±1 percent of the frequency to be measured. If, however, the multiplication M is set to 100 in the above embodiment, the frequency to be measured becomes 100 times the 100 cycles per second, namely signals of 10,000 cycles per second is counted in the time interval of one second by a counter, so that its measuring error may be reduced to ±0.01 percent. Moreover, in order to measure the signal of 100 cycles per second within the above range of error of +0.01 percent by the use of only a counter heretofore employed, the required time therefore is 100 times as long as that of the exemplified device. Accordingly by providing the device of this invention in a conventional electronic counter signals of comparatively low frequencies can be measured in a shorter time and with high accuracy.

It will be apparent that many modifications and variations may be effected without departing from the scope of novel concepts of this invention.

What is claimed is:

1. A frequency multiplier comprising
a variable frequency oscillator having first and second input terminals and an output terminal, means responsive to an input signal having a frequency to be multiplied and connected to said first input terminal of said oscillator to render said oscillator operative in response thereto,
means for rendering said oscillator inoperative after a predetermined number of pulses have been generated by said oscillator, means responsive to said oscillator being rendered inoperative and to a zero crossing at the end of a full cycle of said input signal to produce a control signal having a value dependent upon the time difference between the rendering of said oscillator inoperative and the subsequent zero crossing at the end of said full cycle of said input signal and connected to said second input terminal of said oscillator,
and means in said oscillator responsive to said control signal to vary the frequency therein to a predetermined multiple frequency of the frequency to be multiplied.

2. A frequency multiplier comprising
a variable frequency oscillator having first and second input terminals and an output terminal, means responsive to an input signal having a frequency to be multiplied and connected to said first input terminal of said oscillator to render said oscillator operative in response thereto,
means for rendering said oscillator inoperative after a predetermined number of pulses having been generated by said oscillator, means responsive to said oscillator being rendered inoperative and to a zero crossing at the end of a full cycle of said input signal to produce a control signal corresponding to the time difference between the rendering of said oscillator inoperative and the subsequent zero crossing at the end of said full cycle of said input signal,
and means comprising a semiconductor in said oscillator responsive to said control signal to vary the frequency thereof to a predetermined multiple frequency of the frequency to be multiplied.

3. A frequency multiplier comprising
a variable frequency oscillator having first and second input terminals and an output terminal, means responsive to an input signal having a frequency to be multiplied and connected to said first input terminal of said oscillator to render said oscillator operative in response thereto,
means connected to said output terminal of said oscillator to produce one output pulse upon receiving a predetermined number of input pulses from said oscillator to render said oscillator inoperative, and means responsive to said oscillator being rendered inoperative and to a zero crossing at the end of a full cycle of said input signal to produce a control signal corresponding to the time difference between the rendering of said oscillator inoperative and the subsequent zero crossing at the end of said full cycle of input signal and connected to said second input terminal of said oscillator.

4. A frequency multiplier comprising
first and second flip-flop circuits each having a first input terminal to which respective opposite polarity signals are applied,
means to produce said opposite polarity signals in response to the frequency to be multiplied,
said first and second flip-flop circuits each having a second input terminal for receiving control signals,
said first flip-flop circuits having first and second output terminals,
means for applying signal information from said first output of said first flip-flop to said second input terminal of said second flip-flop circuit,
said second flip-flop circuit having one output terminal,
gating means having a pair of input terminals so arranged as to receive simultaneous signal information from the output terminal of said second flip-flop and the first output terminal of said flip-flop,
means to produce control voltage information corresponding to the ratio of when said gating means is actuated and when said gating means is not actuated,
reference means to provide fixed voltage information,
means for comparing said control voltage information with said fixed voltage information and to produce a corresponding control signal therefrom,
oscillatory means having first and second input terminals and an output terminal,
said first input terminal of said oscillatory means so arranged as to receive signals from said second terminal of said first flip-flop circuit thereby rendering said oscillatory means operative,
means in said oscillatory means to vary the frequency thereof in response to said control signal from said comparing means when said control signal is applied to said second input terminal of said oscillatory means,
and means connecting said output terminal of said oscillatory means to a selector which will produce one output pulse upon receiving a predetermined number of input pulses from said oscillatory means thereby controlling said oscillatory means to a predetermined multiple frequency of the frequency to be multiplied.

5. A frequency multiplier comprising
a variable frequency oscillator having first and second input terminals and an output terminal,
means responsive to the frequency to be multiplied and connected to said first input terminal of said oscillator to render said oscillator operative in response thereto,
gating means having a pair of input terminals so arranged as to receive simultaneous signal information corresponding to the frequency of said oscillator and the desired multiple frequency thereof,
means to produce control voltage information corresponding to the ratio of when said gating means is actuated and when said gating means is not actuated,
reference means to provide a fixed voltage information,
means for comparing said control voltage information with said fixed voltage information and to produce a corresponding control signal therefrom, and responsive means comprising a semiconductor in said oscillator to receive said control signal thereby varying the frequency of said oscillator to a predetermined multiple frequency of the frequency to be multiplied.

6. In a system for determining the frequency of an input signal having an unknown frequency comprising
a variable frequency oscillator having first and second input terminals and an output terminal, means connected to said first input terminal of said oscillator to render said oscillator operative in response to the input signal,
means for rendering said oscillator inoperative after a predetermined number of pulses have been generated by said oscillator, means responsive to said oscillator being rendered inoperative and to a zero crossing at the end of a full cycle of said input signal to produce a control signal corresponding to the time difference between the rendering of said oscillator inoperative and the subsequent zero crossing of said input signal,
means in said oscillator responsive to said control signal to vary the frequency therein to a predetermined multiple frequency of the frequency to be multiplied,
and counting means connected to said output terminal of said oscillator to indicate the vaue of said unknown frequency.

7. In a system for determining the frequency of an input signal having an unknown frequency comprising,
a variable frequency oscillator having first and second input terminals and an output terminal,
means connected to said first input terminal of said oscillator to render said oscillator operative in response to the input signal,
means for rendering said oscillator inoperative after a predetermined number of pulses have been generated by said oscillator, means responsive to said oscillator being rendered inoperative and to a zero crossing at the end of a full cycle of said input signal to produce a control signal corresponding to the time difference between the rendering of said oscillator inoperative and the subsequent zero crossing at the end of said full cycle of said input signal,
and means comprising a semiconductor in said oscillator responsive to said control signal to vary the frequency thereof to a predetermined multiple frequency of the frequency to be multiplied,
and counting means connected to said output terminal of said oscillator to indicate the value of said unknown frequency.

8. In a system for determining the frequency of an input signal having an unknown frequency comprising,
a variable frequency oscillator having first and second input terminals and an output terminal,
means responsive to the input signal connected to said first input terminal of said oscillator to render said oscillator operative in response thereto,
means connected to said output terminal of said oscillator to produce one output pulse upon receiving a predetermined number of input pulses from said oscillator to render said oscillator inoperative,
means responsive to said oscillator being rendered inoperative and to a zero crossing at the end of a full cycle of said input signal to produce a control signal corresponding to the time difference between the rendering of said oscillator inoperative and the subsequent zero crossing at the end of said full cycle of said input signal, said control signal being connected to said second input terminal of said oscillator to control the frequency thereof,
and counting means connected to said output terminal of said oscillator.

9. In a system for determining the frequency of an unknown frequency comprising
a variable frequency oscillator having first and second input terminals and an output terminal,
means responsive to the frequency to be multiplied and connected to said first input terminal of said oscillator to render said oscillator operative in response thereto,
gating means having a pair of input terminals so arranged as to receive simultaneous signal information corresponding to the frequency of said oscillator and the desired multiple frequency thereof,
means to produce control voltage information corresponding to the ratio of when said gating means is actuated and when said gating means is not actuated,
reference means to provide a fixed voltage information,
means for comparing said control voltage information with said fixed voltage information and to produce a corresponding control signal therefrom,
and responsive means comprising a semiconductor in said oscillator to receive said control signal thereby varying the frequency of said oscillator to a predetermined multiple frequency of the frequency to be multiplied,
and counting means connected to said output terminal of said oscillator.

10. In a system for determining the frequency of an unknown frequency comprising,
first and second flip-flop circuits each having a first input terminal to which respective opposite polarity signals are applied,
means to produce said opposite polarity signals in response to the unknown frequency,
said first and second flip-flop circuits each having a second input terminal for receiving control signals,
said first flip-flop circuit having first and second output terminals,
means for applying signal information from said first output of said first flip-flop to said second input terminal of said second flip-flop circuit,
said second flip-flop circuit having one output terminal,
gating means having a pair of input terminals so arranged as to receive simultaneous signal information from the output terminal of said second flip-flop and the first output terminal of said first flip-flop,
means to produce control voltage information corresponding to the ratio of when said gating means is actuated and when said gating means is not actuated,
reference means to provide fixed voltage information,
means for comparing said control voltage information with said fixed voltage information and to produce a corresponding control signal therefrom,
oscillatory means having first and second input terminals and an output terminal,
said first input terminal of said oscillatory means so arranged as to receive signals from said second terminal of said first flip-flop circuit thereby rendering said oscillatory means operative,
means in said oscillatory means to vary the frequency thereof in response to said control signal from said comparing means when said control signal is applied to said second input terminal of said oscillatory means,
and means connecting said output terminal of said oscillatory means to a selector which will produce one output pulse upon receiving a predetermined number of input pulses from said oscillatory means thereby controlling said oscillatory means to a predetermined multiple frequency of the frequency to be multiplied,
and counting means connected to said output terminal of said oscillatory means.

11. A frequency multiplier comprising first and second flip-flop circuits each having a first input terminal to which respective opposite polarity signals are applied,
means to produce said opposite polarity signals in response to the frequency to be multiplied, said first and second flip-flop circuits each having a second input terminal for receiving control signals,
said first flip-flop circuit having first and second output terminals, means for applying signal information from said first output of said first flip-flop to said second input terminal of said second flip-flop circuit, said second flip-flop circuit having one output terminal, gating means having a pair of input terminals so arranged as to receive simultaneous signal information from the output terminal of said second flip-flop and the first output terminal of said first flip-flop, means to produce control voltage information corresponding to the ratio of when said gating means is actuated and when said gating means is not actuated, reference means to provide fixed voltage information, means for comparing said control voltage information with said fixed voltage information and to produce a corresponding control signal therefrom, oscillatory means having first and second input terminals and an output terminal, said oscillatory means comprising an astable multivibrator, said first input terminal of said oscillatory means so arranged as to receive signals from said second terminal of said first flip-flop circuit thereby rendering said oscillatory means operative, means including the internal operating resistance of a transistor connected in said oscillatory means to vary the frequency thereof in response to said control signal from said comparing means when said control signal is applied to said transistor, said oscillatory means oscillating at its highest frequency when no control signal is applied to said transistor, means for changing the value of said control signal in response to a change in frequency of the frequency to be multiplied thereby maintaining a predetermined multiple frequency of said oscillatory means.

and means connecting said output terminal of said oscillatory means to a selector which will produce one output pulse upon receiving a predetermined number of input pulses from said oscillatory means thereby controlling said oscillatory means to a predetermined multiple frequency of the frequency to be multiplied.

12. In a system for determining the frequency of an unknown frequency comprising, first and second flip-flop circuits each having a first input terminal to which respective opposite polarity signals are applied, means to produce said opposite polarity signals in response to the unknown frequency, said first and second flip-flop circuits each having a second input terminal for receiving control signals, said first flip-flop circuit having first and second output terminals, means for applying signal information from said first output of said first flip-flop to said second input terminal of said second flip-flop circuit, said second flip-flop circuit having one output terminal, gating means having a pair of input terminals so arranged as to receive simultaneous signal information from the output terminal of said second flip-flop and the first output terminal of said first flip-flop, means to produce control voltage information corresponding to the ratio of when said gating means is actuated and when said gating means is not actuated, means to change the ratio of when said gating means is actuated and when said gating means is not actuated during the sampling of each cycle of the unknown frequency, reference means to provide fixed voltage information, means for comparing said control voltage information with said fixed voltage information and to produce a corresponding control signal therefrom, oscillatory means having first and second input terminals and an output terminal, said oscillatory means comprising an astable multivibrator, said first input terminal of said oscillatory means so arranged as to receive signals from said second terminal of said first flip-flop circuit thereby rendering said oscillatory means operative, means including the internal operating resistance of a transistor connected in said oscillatory means to vary the frequency thereof in response to said control signal from said comparing means when said control signal is applied to said transistor, said oscillatory means oscillating at its highest frequency when no control signal is applied to said transistor, and means connecting said output terminal of said oscillatory means to a selector which will produce one output pulse upon receiving a predetermined number of input pulses from said oscillatory means thereby controlling said oscillatory means to a predetermined multiple frequency of the frequency to be multiplied, and counting means connected to said output terminal of said oscillatory means.

References Cited by the Examiner

UNITED STATES PATENTS 3,109,148   10/1963   Siegal _____ 331—25

ARTHUR GAUSS, *Primary Examiner.*